(12) United States Patent
Cheng (10) Patent No.: US 12,455,716 B2
(45) Date of Patent: Oct. 28, 2025

(54) AUDIO CONCATENATION METHOD IMPLEMENTED ON OPERATING SYSTEM AND NON-TRANSITORY STORAGE MEDIUM

(71) Applicant: IEI INTEGRATION CORP., New Taipei (TW)

(72) Inventor: Yuan-Cheng Cheng, New Taipei (TW)

(73) Assignee: IEI INTEGRATION CORP., New Taipei (TW)

( * ) Notice: Subject to any disclaimer, the term of this patent is extended or adjusted under 35 U.S.C. 154(b) by 191 days.

(21) Appl. No.: 18/402,419

(22) Filed: Jan. 2, 2024

(65) Prior Publication Data
US 2025/0068378 A1 Feb. 27, 2025

(30) Foreign Application Priority Data
Aug. 24, 2023 (TW) ................ 112131908

(51) Int. Cl.
*G06F 3/16* (2006.01)
(52) U.S. Cl.
CPC ............. *G06F 3/162* (2013.01); *G06F 3/165* (2013.01)

(58) Field of Classification Search
CPC ................. G06F 3/162; G06F 3/165
See application file for complete search history.

(56) References Cited

U.S. PATENT DOCUMENTS

| 2021/0132898 A1* | 5/2021 | Lee ........................ G06F 3/011 |
| 2023/0306977 A1* | 9/2023 | Cenzano Ferret .... G10L 19/173 |
| 2024/0213943 A1* | 6/2024 | Steffensen .............. G10L 25/48 |

* cited by examiner

*Primary Examiner* — Phung-Hoang J Nguyen
(74) *Attorney, Agent, or Firm* — HDLS IPR SERVICES; Chun-Ming Shih (57) ABSTRACT

An audio concatenation method adopted on an electronic device having an operating system is disclosed and includes following steps: executing an audio subsystem on the operating system, wherein the audio subsystem has a service resource checker; continuously checking the status of an audio service of the operating system through the service resource checker; and, upon determining that the status of the audio service is a calling request (Incalling), creating a channel to concatenate two audio-card ports designated by the calling request, so as to execute a calling procedure corresponding to the calling request through the two audio-card ports being concatenated.

8 Claims, 7 Drawing Sheets

AUDIO CONCATENATION METHOD IMPLEMENTED ON OPERATING SYSTEM AND NON-TRANSITORY STORAGE MEDIUM

TECHNICAL FIELD

The present disclosure relates to an audio concatenation method and particularly relates to the audio concatenation method implemented on an operating system.

DESCRIPTION OF RELATED ART

Some of the operating systems are developed for use on personal mobile devices (for example, Android is developed for smartphones or tablets). These personal mobile devices usually have single set of audio unit and do not have the requirement for audio-card concatenation or switching. Therefore, this kind of operating systems are predetermined to non-support for a function of an audio-card concatenation or switching.

With the development of technology, many electronic devices become more intelligent, and the operating system is adopted based on convenience (such as an open source code). However, a usage environment of part of the electronic devices is complex and different from the personal mobile devices. For example, the on-board computer on a public transportation or a kiosk placed in the square may have three or more than three audio units (for example, one audio-card for codec and a plurality of audio-cards for high definition multimedia interface (HDMI)). At this time, how to easily modify the operating system to implement the requirement of the audio-card concatenation or switching is the subject for those in the field.

Taking Android open source project (AOSP) of open source code in Android as an example, initially, AOSP does not support a call function of a 4G/5G network module. The main reason is that the 4G/5G network modules are provided by many manufacturers, but each of the manufacturers has different approaches to the hardware abstract layer (HAL), so the HALs may be incompatible with each other.

Generally speaking, if a user's electronic device is developed by AOSP, and the user hopes the electronic device supports the call function of the 4G/5G network module, the user needs to request the manufacturer of the 4G/5G network module to assist for modifying the HAL of AOSP to implement the audio-card for the 4G/5G network module in the HAL. However, the above approach is more complicated and takes a lot of time. Furthermore, when the 4G/5G network module is replaced to different providers, the user has to re-modify the HAL, which is quite troublesome.

SUMMARY OF THE DISCLOSURE

The main purpose of the present disclosure is to provide an audio concatenation method and a non-transitory storage medium implemented on the operating system, which may concatenate, by an audio subsystem, different audio-cards/audio-card ports to expand the function of the electronic device.

In order to achieve the above purpose, the audio concatenation method adopted on an electronic device having an operating system, the audio concatenation method comprising:

a) executing an audio subsystem on the operating system;

b) continuously checking, by a service resource checker, of the audio subsystem, a status of an audio service in a system framework of the operating system; and c) upon determining that the status of the audio service is an incalling, creating by the audio subsystem, a channel to concatenate two audio-card ports designated by the incalling on the operating system to execute a calling procedure corresponding to the incalling.

Compared to the related art, the present disclosure concatenating, by the audio subsystem independent of a system framework of the operating system, the different audio-cards/audio-card ports executing on the operating system, which is configured to quickly expand the function of the electronic device without modifying the HAL of the system framework and supports the quick switch of the audio-card.

DETAILED DESCRIPTION

The technical contents of this disclosure will become apparent with the detailed description of embodiments accompanied with the illustration of related drawings as follows. It is intended that the embodiments and drawings disclosed herein are to be considered illustrative rather than restrictive.

In some embodiment of the present disclosure is described in detail below with reference to the drawings.

The present disclosure is an audio concatenation method implemented on an operating system (which is abbreviated as the concatenation method below), and the concatenation method is applied on an electronic device having the operating system executed internally. The concatenation method is used to concatenate a plurality of audio-cards or a plurality of audio-card ports related to the same audio-card in the electronic device. As a result, the present disclosure may conveniently expand the functions of the electronic device (such as the call function or an audio answering function, etc.).

Figure 1A:
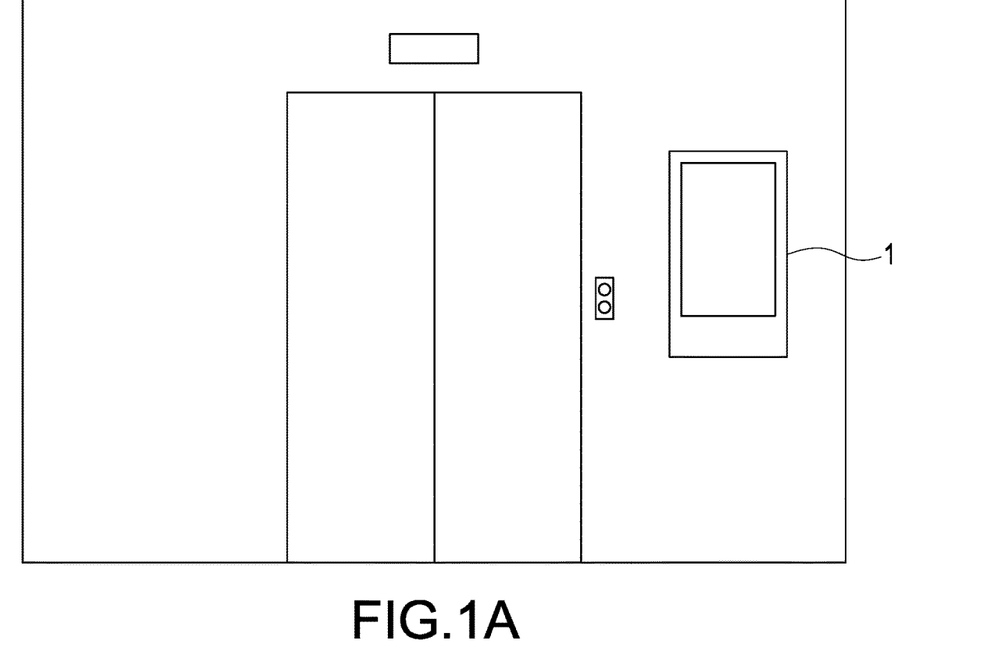
FIG. 1A is a schematic diagram of the electronic device in accordance with a first embodiment of the present disclosure.
Figure 1B:
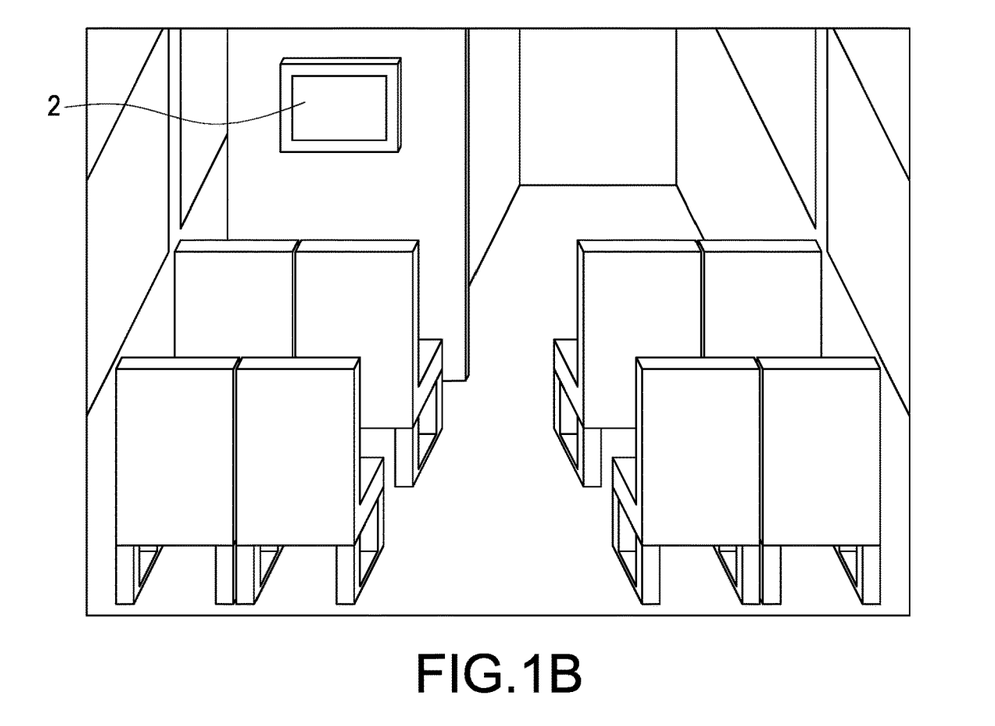
FIG. 1B is a schematic diagram of the electronic device in accordance with a second embodiment of the present disclosure.

First, please refer to FIG. 1A and FIG. 1B, which are respectively schematic diagrams of the electronic device in accordance with the first and the second embodiments of the present disclosure.

In the embodiment of FIG. 1A, the electronic device 1 is a kiosk, the kiosk is disposed in public places to play advertisements. Generally speaking, the kiosk has high definition multimedia interface (HDMI) and the predetermined output audio-card of the kiosk is the audio-card for HDMI to play advertising information (including images and audio) by HDMI.

In the embodiment of FIG. 1B, the electronic device 1 is an on-board computer on a public transportation (for example a bus), used to play traffic information. The on-board computer usually has HDMI, and the predetermined output audio-card of the device is the audio-card for HDMI to play traffic information (including images and audio) by HDMI.

It is worth mentioning that the electronic device 1, 2 described above generally also have the audio-card for codec (corresponding to a built-in speaker) or the 4G/5G network module (also has the audio-card). As mentioned above, the predetermined audio-card of the electronic device 1, 2 is the audio-card for HDMI, and the operating system (taking Android as an example) used by the electronic device 1, 2 does not initially support concatenation between different audio-cards, and does not support the audio-card for the 4G/5G network module. Therefore, how to make the electronic device 1, 2 concatenate the audio-cards and implement such extended functions as the call function or an audio answering function, etc., is the main technical problem solved by the present disclosure.

Figure 2:
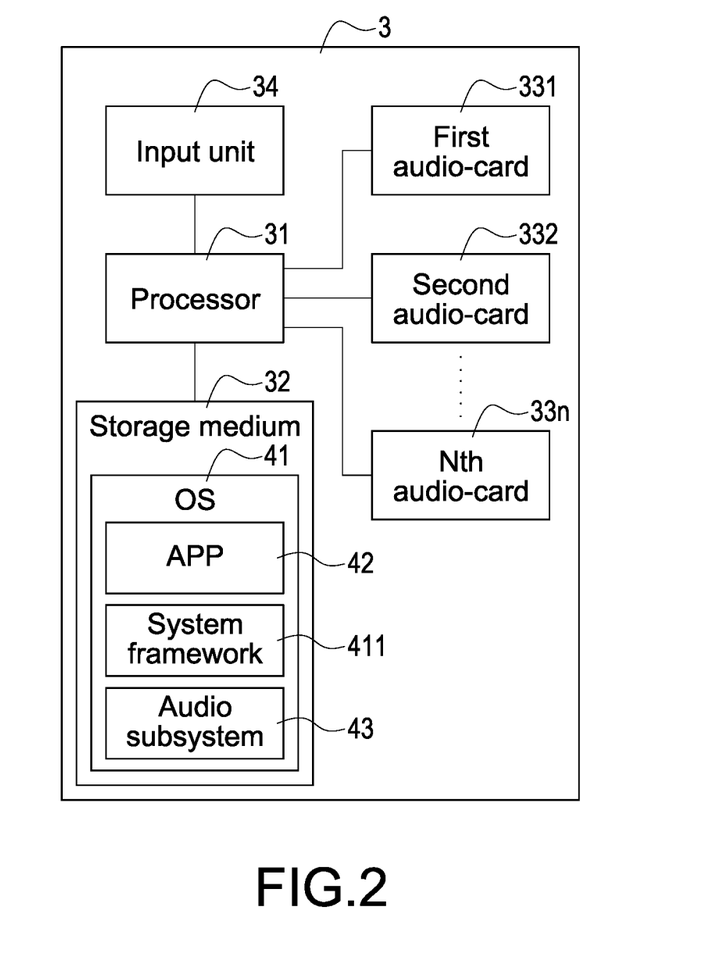
FIG. 2 is a block diagram of the electronic device in accordance with some embodiments of the present disclosure.

Refer to FIG. 2 which is a block diagram of the electronic device in accordance with some embodiments of the present disclosure. FIG. 2 discloses the electronic device 3 used to execute the concatenation method of present disclosure. The electronic device 3 may be, for example, the kiosk shown in FIG. 1A, the on-board computer shown in FIG. 1B, or other electronic devices running the operating system, but is not limited to this.

As shown in FIG. 2, the electronic device 3 has a processor 31, a storage medium 32, the audio-cards 33, and an input unit 34. The processor 31 is electrically connected to the storage medium 32, the audio-cards 33, and the input unit 34.

In one embodiment, the processor 31 may be, for example, a programmable logic controller (PLC), a central process unit (CPU), a micro control unit (MCU), a field programmable gate array (FPGA), a system on chip (SoC), here is not intended to be limiting. The storage medium 32 may be a non-transitory storage medium, for example, a flash memory, a read only memory (ROM), a hard disk drive (HDD), a solid state drive (SSD), or an optical storage, etc., here is not intended to be limiting.

In one embodiment, the plurality of audio-cards 33 include the first audio-card 331, the second audio-card 332 to the nth audio-card 33n, the plurality of audio-cards 33 may be, for example, the audio-card for HDMI, the audio-card for codec, and the audio-card for 4G/5G network module, etc., here is not intended to be limiting.

In one embodiment, the input unit 34 may be, for example, a button, a touchpad, a touch screen, or an audio input interface, etc., and configured to receive an external operation to trigger electronic device 3 to execute the concatenation method of the present disclosure. For example, the user may enable, by the input unit 34, an application (APP) related to a call on the electronic device 3 to trigger the concatenation method of the present disclosure to concatenate the two audio-cards/audio-cards ports (details are described below) required by the APP.

In the present disclosure, the storage medium 32 stores the operating system 41, the APP 42, and the audio subsystem 43. The audio subsystem 43 is independent from the system framework of the operating system and is a background process executed in the background. In one embodiment, the audio subsystem 43 is the program implemented by a tinyASLA, the operating system 41 is any operating system that supports the tiny ASLA, for example, Android or a NUTTX operating system, etc., here is not intended to be limiting.

After the electronic device 3 is booted, the electronic device 3 executes the operating system 41 by the processor 31, and the operating system 41 runs the drivers of a plurality of audio-cards 33. When the user has a need for call, the user may trigger the APP 42 related to the call on the electronic device 3. Since the APP 42 is executed based on the operating system 41, the operating system 41 may get all statuses of the APP 42 (for example, recording the status of the APP 42 by the audio service 4111 shown in FIG. 3). In the present disclosure, the electronic device 3 executes the audio subsystem 43 by the processor 31, and the audio subsystem 43 continuously requests the operating system 41 for the status of the APP 42 (or the other service that occupies the audio-card), and when the APP 42 is known for starting the call, the concatenation method of the present disclosure is executed. Therefore, the audio subsystem 43 may support the electronic device 3 to concatenate the plurality of the audio-cards 33 (or the plurality of the audio-cards ports of the single audio-card) to implement the call function.

In one embodiment, the storage medium 32 is the non-transitory storage medium, and the audio subsystem 43 is recorded in the storage medium 32 in a form of a computer-executable program code. After the electronic device 3 executes the computer-executable program code, the audio subsystem 43 is executed to implement the concatenation method of the present disclosure (details are described below).

Figure 3:
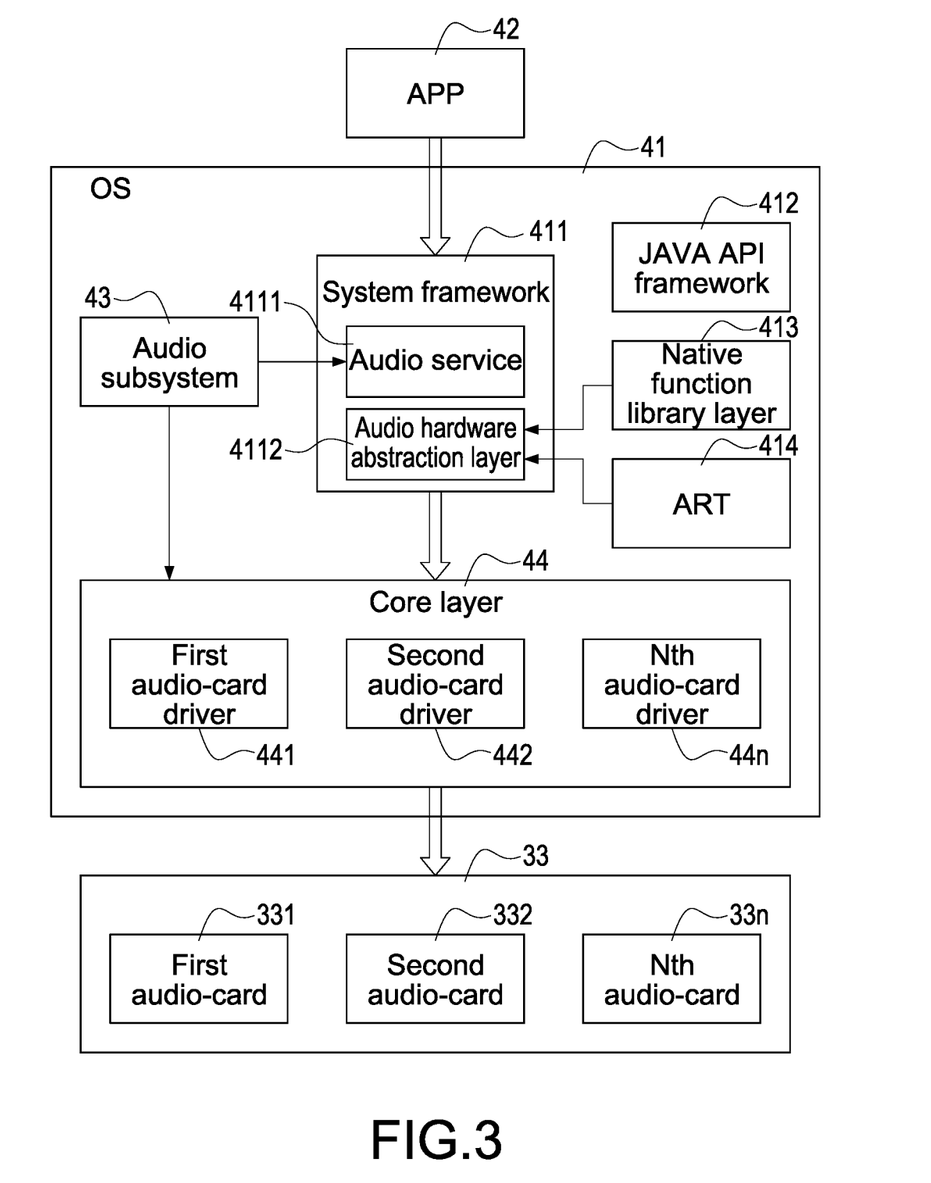
FIG. 3 is a schematic diagram of the communication architecture in accordance with some embodiments of the present disclosure.

Please refer to FIG. 3, which is a schematic diagram of the communication architecture in accordance with some embodiments of the present disclosure. As shown in FIG. 3, the operating system 41 includes the system framework 411, a JAVA API framework 412, a native function library layer 413, the audio subsystem 43, and a core layer 44. The concatenation method of the present disclosure is implemented by the audio subsystem 43. The audio subsystem 43 runs in the operating system 41, but is independent from the system framework 11.

In one embodiment, the operating system 41 is Android, the audio subsystem 43 is a program implemented by tiny ALSA, the core layer 44 is a Linux core layer, and the operating system 41 further includes an Android runtime (ART) 414.

As shown in FIG. 3, in the core layer 44 runs a plurality of drivers of the plurality of audio-cards of the electronic device 3. The drivers include a first audio-card driver 441, a second audio-card driver 442 to a nth audio-card driver 44n. The audio-card drivers are corresponding to the plurality of audio-cards 33 (hardware) of the electronic device 3, for example, the first audio-card 331, the second audio-card 332 to the nth audio-card 33n shown in FIG. 2.

As shown in FIG. 3, the system framework 411 at least includes an audio service 4111 and an audio HAL 4112 for monitoring and processing the call status of the electronic device 3. When the related arts use the audio-card, the operating system 41 generally concatenates the audio-card drivers in the core layer 44 through the audio HAL 4112 of the system framework 411. In the present disclosure, the audio subsystem 43 continuously checks, in the background, the audio service 4111 of the system framework 411. When the audio subsystem 43 detects the incalling through the audio service 4111, the audio subsystem 43 directly concatenates the plurality of audio-card drivers in the core layer 44 (or concatenates different audio-card ports of the same audio-card) to implement the required function.

Figure 4:
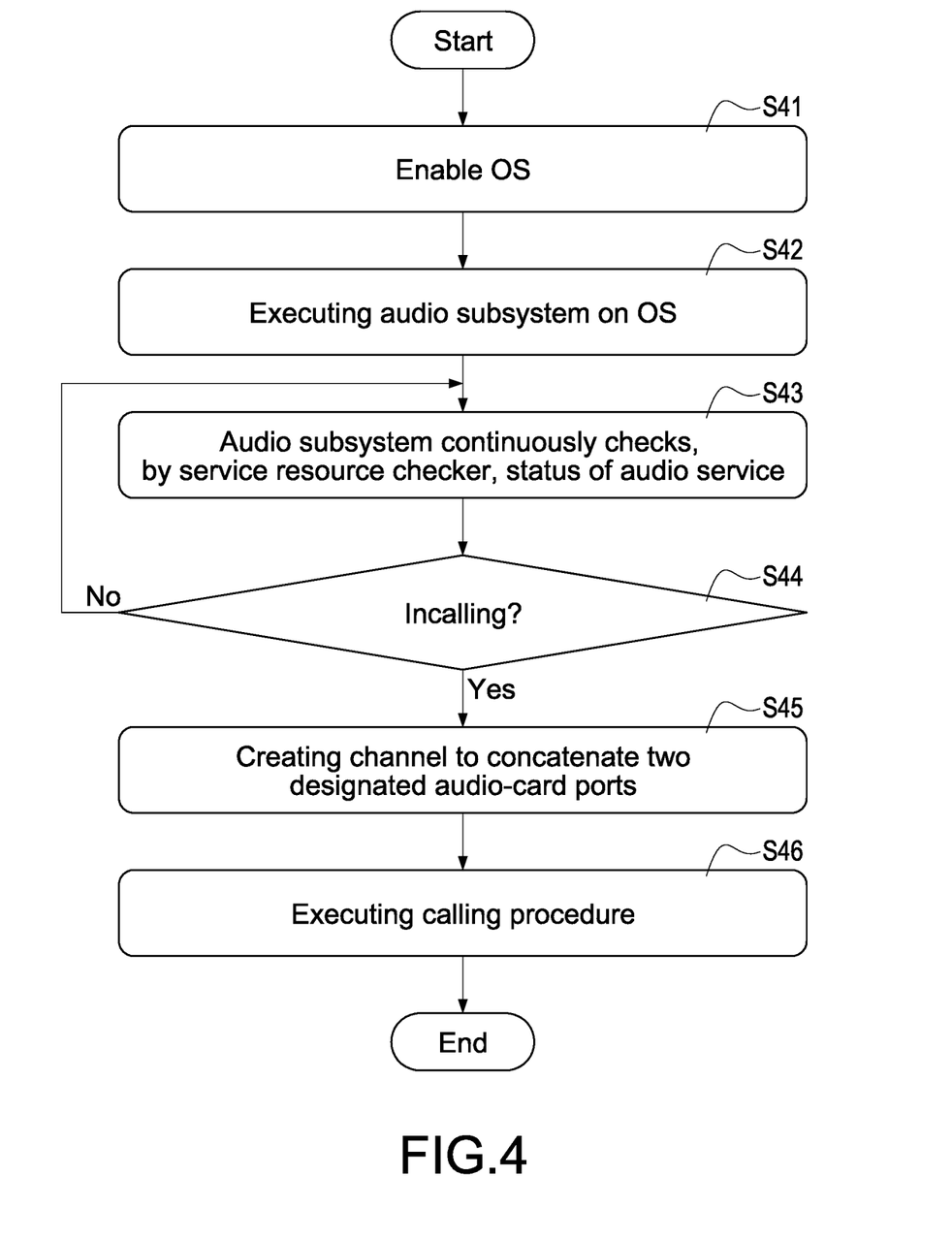
FIG. 4 is a flowchart of the concatenation method in accordance with some embodiments of the present disclosure.

Please refer to FIG. 4, which is a flowchart of the concatenation method in accordance with some embodiments of the present disclosure. As shown in FIG. 4, the electronic device 3 enables the operating system 41 after booting (the step S41), and then the operating system 41 executes the audio subsystem 43 (the step S42). In the present disclosure, the audio subsystem 43 at least includes a service resource checker configured to detect the status of the audio service of the operating system 41 and dynamically create a channel to concatenate the audio-cards or the audio-card ports (details are described below).

In the present disclosure, the audio subsystem 43 operates in the background after being executed, and continuously checks the status of the audio service 4111 of the operating system 41 (the step S43) through the service resource checker to determine whether the status of the audio service 4111 is the incalling or not (the step S44). If it is determined in the step S43 that the audio service is currently in an idle status, the audio subsystem 43 returns to the step S42 to continuously check the status of the audio service 4111 through the service resource checker.

If it is determined in the S43 that the audio service 4111 is the incalling, the audio subsystem 43 dynamically creates a channel or a plurality of channels to concatenate the two audio-card ports related to the incalling on the operating system 41 (the step S45) to execute the calling procedure corresponding to the incalling through the two audio-card ports (the step S46).

In the embodiments where the operating system 41 is Android, the audio subsystem 43 implements the channel through Bionic C, here is not intended to be limiting. In the present disclosure, the channel created by the audio subsystem 43 is configured to concatenate one audio-card input port and one audio-card output port. In one embodiment, the channel concatenates the input port of one audio-card and the output port of another audio-card. In another embodiment, the channel concatenates the audio-card input port and audio-card output port of the same audio-card (details are described below).

Figure 5:
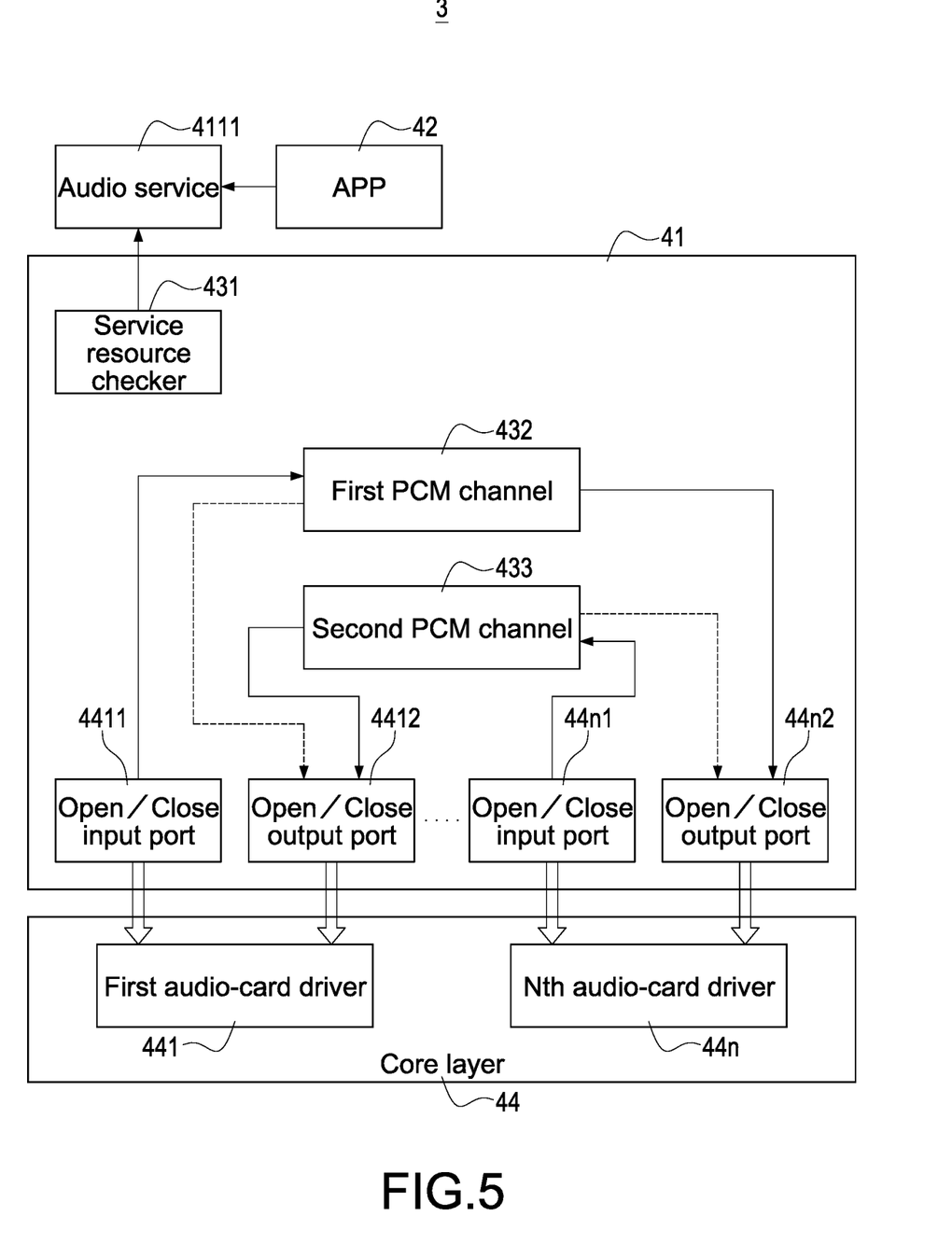
FIG. 5 is a schematic diagram of the concatenation architecture in accordance with some embodiment of the present disclosure.

Please refer to FIG. 5, which is a schematic diagram of the concatenation architecture in accordance with some embodiment of the present disclosure. As shown in FIG. 5, the audio subsystem 43 of the present disclosure continuously checks the status of the audio service 4111 of the system framework 411 in the operating system 41 through the service resource checker 431. The status of the audio service 4111 is related to the use of the APP 42 related to the call on the operating system 41, and at least includes the statuses, such as a no call, a calling in, and the incalling, etc.

When the service resource checker 431 checks that the status of the audio service 4111 is the incalling, the audio subsystem 43 opens the two audio-card ports (including one input port and one output port) designated by the incalling through a command (for example, implemented by tiny ALSA) and dynamically create a channel to concatenate the input port and the output port, which are opened.

In one embodiment, the channel is a pulse-code modulation (PCM) channel. When the audio subsystem 43 sends the requirement of the concatenation, the core layer 44 of the operating system 41 transmits a PCM data of the audio-card, by the corresponding audio-card driver, to the audio subsystem 43 through the audio-card port, and the audio subsystem 43 transmits the PCM data by the PCM channel being created. Specifically, the operating system 41 may transmit the PCM data of the corresponding audio-card to the PCM channel created by the audio subsystem 43 through the input port designated by the calling procedure, and the audio subsystem 43 transmits the received PCM data to the output port designated by the calling procedure through the PCM channel.

In one embodiment, after one calling procedure is created, it must include an input and an output of audio, and the input and output of the audio are implemented by the different audio-card. In this embodiment, the input port and the output port belong to two different audio cards. Moreover, the audio subsystem 43 creates at least two PCM channels to concatenate two audio-cards.

In the embodiment of FIG. 5, the service resource checker 431 checks that the status of the audio service 4111 is changed to the incalling, and the audio-card designated by the incalling is the first audio-card and the nth audio-card. In this embodiment, the audio subsystem 43 immediately creates a first PCM channel 432 and a second PCM channel 433, concatenates the input port 4411 of the first audio-card (corresponding to the first audio-card driver 441) and the output port 44$n$2 of the nth audio-card (corresponding to the nth audio-card driver 44$n$) through by the first PCM channel 432, and concatenates the input port 44$n$1 of the nth audio-card and the output port 4412 of the first audio-card through the second PCM channel 433.

In one embodiment, the audio subsystem 43 implements the first PCM channel 432 and the second PCM channel 433 through Bionic C function library of the native function library layer 413 of Android, and implements the opening and closing control of the audio-card port based on tiny ALSA of the native function library layer 413.

Specifically, when the audio subsystem 43 is going to create the concatenation of two audio-card ports, the audio subsystem 43 opens the two audio-card ports through the commands created by tiny ALSA. After the two audio-card ports are opened, it may transmit the PCM data corresponding to the audio-card to the audio subsystem 43. Moreover, after the calling procedure is ended, the audio subsystem 43 closes the two audio-card ports through the commands created by tiny ALSA to release resources.

Through the concatenation by the first PCM channel 432, the electronic device 3 may receive an audio signal from one side in the calling procedure by the input port of the first audio-card and play that by the output ports of the second audio-card. Through the concatenation by the second PCM channel 433, the electronic device 3 may receive an audio signal from the other side in the calling procedure by the input port of the second audio-card and play that by the output ports of the first audio-card. As a result, the electronic devices 3 may implement the call function.

In one embodiment, electronic device 3 at least includes an audio-card for a codec, an audio-card for an HDMI, and an audio-card for a 4G/5G network module.

Taking AOSP as an example, the audio HAL 4112 of the system framework 411 does not support the audio-card for the 4G/5G network module. If the electronic device 3 adopts AOSP as the operating system 41, even the electronic device 3 has the 4G/5G network module, the audio-card for the 4G/5G network module may still not be used for concatenation. However, the incalling is usually operated through the internet and the other communication devices. Therefore, in one embodiment, the audio subsystem 43 mainly creates the channel to concatenate the audio-card port for the 4G/5G network module and the audio-card port for the codec, or concatenate the audio-card port for the 4G/5G network module and the audio-card port for the HDMI. As a result, it may solve the technical problem of audio HAL 4112 of the related-art AOSP that does not support the audio-card port for the 4G/5G network module.

However, the mention above is only one of the specific embodiments of the present disclosure, in other embodiments, according to the designated content of calling procedure, the channel created by the audio subsystem 43 may also concatenate the audio-card port for the codec and the audio-card port for the HDMI, or concatenate the different audio-card ports for the HDMI, here is not intended to be limiting.

In another embodiment, the input port and the output port, which are designated by the calling procedure created by the APP 42, belong to the same audio card. In this embodiment, the audio subsystem 43 only need to create a single channel to concatenate the two audio-card ports required by the calling procedure (as shown by the dotted line in FIG. 5). Through the single channel to concatenate the input port of one audio-card and the output port of the same audio-card, a loopback mode of audio may be implemented.

More specifically, in the embodiment of the input port and the output port being designated to the same audio card, the audio subsystem 43 may also be equipped with a required plug-in in the channel to expand the function of the electronic device 3. For example, the user may write an artificial intelligent (AI) audio processing function as the plug-in in the channel. Through the AI audio processing function, after receiving the PCM data from the input port, the audio subsystem 43 of the present disclosure may produce a suitable response after automatically analyzing the content of the PCM data. Furthermore, the audio subsystem 43 sends the response by the output port.

For example, when receiving the concatenation requirement from the audio subsystem 43, the input port, which is designated by the calling procedure (for example, the input port 4411 of the first audio-card), transmits the PCM data of audio-card to the PCM channel (for example, the first PCM channel 432) of the audio subsystem 43. Furthermore, the PCM channel executes the AI audio processing to the received PCM data and produces the corresponding AI audio response. After that, the audio subsystem 43 transmits the AI audio response to the output port (for example, the output port 4412 of the first audio-card) of audio-card designated by the calling procedure through the PCM channel (for example, the first PCM channel 432). As a result, the electronic device 3 may implement the automatic AI audio response function.

To implement the calling procedure, the audio subsystem 43 needs to check that the audio-card designated by the calling procedure is available (that means the corresponding driver is operating), therefore, the audio subsystem 43 needs to check that which audio-cards on the electronic device 3 is available.

Figure 6:
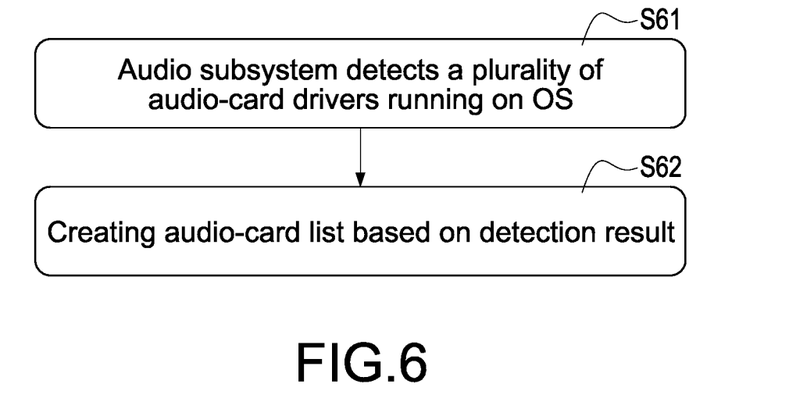
FIG. 6 is a flowchart of the detection process in accordance with some embodiments of the present disclosure.

Please refer FIG. 6, which is a flowchart of the detection process in accordance with some embodiments of the present disclosure. FIG. 6 is used to further explain the flowchart of FIG. 4 in detail. As shown in FIG. 6, after the operating system 41 executes the audio subsystem 43, the audio subsystem 43 detects the plurality of audio-card drivers running on the operating system in advance (the step S61). If one audio-card driver is already operating, that means the physical audio-card corresponding to this audio-card driver is available. Furthermore, the audio subsystem 43 creates the audio-card list based on the detection result (the step S62).

The audio-card list records the plurality of audio-card drivers/audio-cards, which are already operating on the operating system 41. When the audio subsystem 43 creates the channel, it refers to the audio-card list to determine whether the audio-card/the audio-card port designated by calling procedure is available. If the audio-card/the audio-card port designated by the calling procedure is not available (for example, not exit in the audio-card list) the audio subsystem 43 does not create the channel.

Figure 7:
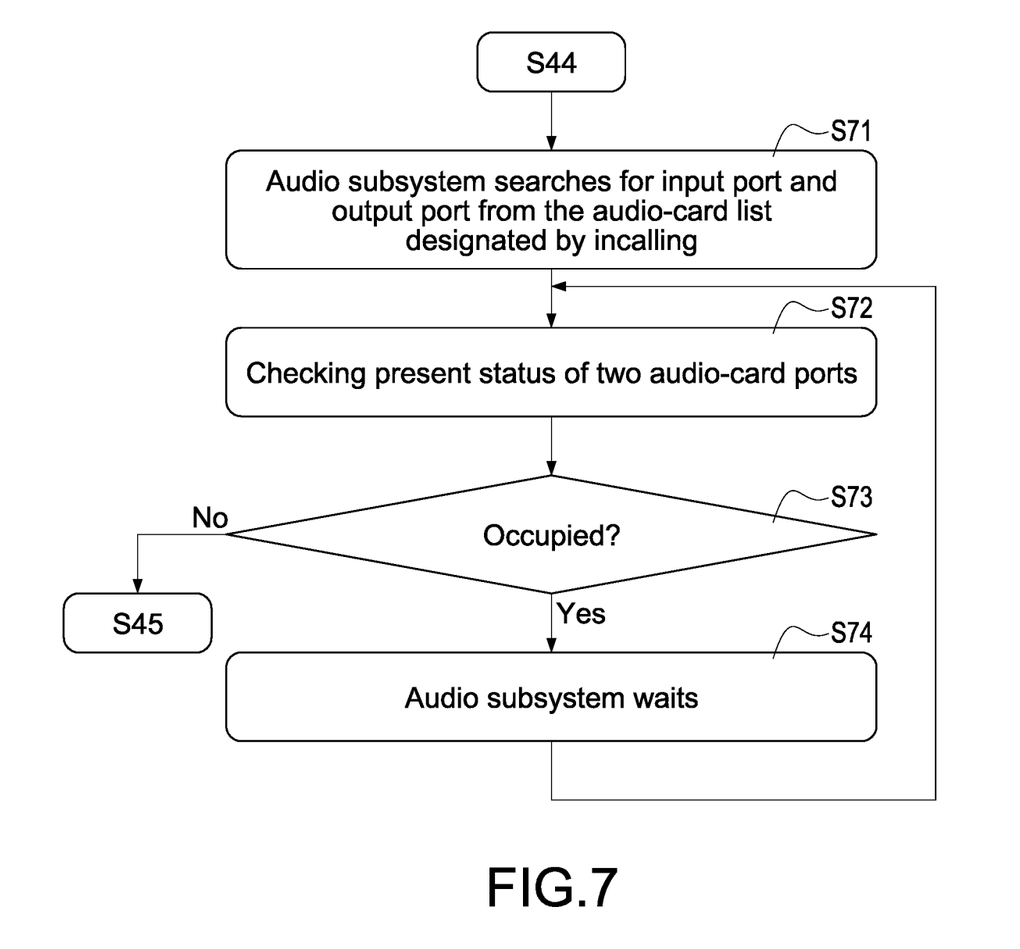
FIG. 7 is a flowchart of the status determination process in accordance with some embodiments of the present disclosure.

Please refer to FIG. 7, which is a flowchart of the status determination process in accordance with some embodiments of the present disclosure. As the above mention, after the audio subsystem 43 is executed, it detects the audio-card drivers, which are already operating on the operating system 41, and creates the audio-card list. For example, if the audio subsystem 43 determines that the audio-card for codec, the audio-card for 4G/5G network module and the audio-card for HDMI on the operating system 41 are already operating, it may create an audio-card list, such as [card 0: codec; card 1: modem; card 2: HDMI]. In this embodiment, the number of the audio-card for codec is 0, the number of the audio-card for 4G/5G network module is 1, the number of the audio-card for HDMI is 2. When the incalling is detected, the audio subsystem 43 determines to concatenate which number of audio-card/audio-card port and which number of audio-card/audio-card port based on the incalling and the content of the audio-card list.

However, the mention above is only one of the specific embodiments of the present disclosure, the content of the audio-card list is not limited by the above format.

In the S44 in FIG. 4, when the service resource checker 431 detects that the status of the audio service 4111 is changed to the incalling, the audio subsystem 43 searches the audio-card list for the input port and the output port designated by the incalling (the step S71). The input port and the output port may belong to the same or different audio-cards depending on the content designated by the incalling.

After that, the audio subsystem 43 checks the audio service 4111 through the service resource checker 431 again to confirm the status of the two audio-card ports designated by the incalling (the step S72). More specifically, the service resource checker 431 checks the audio service 4111 to confirm whether any one of the two audio-card ports designated by the incalling is occupied by the other processes of the operating system 41 (the step S73).

If it is determined in step S73 that any one of the designated audio-card ports is occupied, the audio subsystem 43 waits and temporarily does not create the channel (the step S74). Furthermore, the audio subsystem 43 returns to the step S72 to continuously check the audio service 4111 to confirm the status of the designated audio-card port through the service resource checker 431. If it is determined in the step S73 that the two audio-card ports designated are not occupied, the audio subsystem 43 may execute the step S45 shown in FIG. 4 to create one or more channels to concatenate the two designated audio-card ports to implement the calling procedure corresponding to the incalling. As the above mention, the audio subsystem 43 creates one channel to concatenate the two audio-card ports on the same audio-card, or creates two channels to concatenate the two different audio-cards.

As above mention, the audio subsystem 43 needs to check whether the audio-card port designated is occupied before creating the channel. In other words, there may be other processes in the electronic device 3 that need to use the audio-card/audio-card port (for example, playing advertising information needs the audio-card for HDMI or playing music needs the audio-card for codec, etc.). Therefore, the audio subsystem 43 may selectively release the designated audio-card/audio-card port after the calling procedure is ended to avoid wasting resources.

Figure 8:
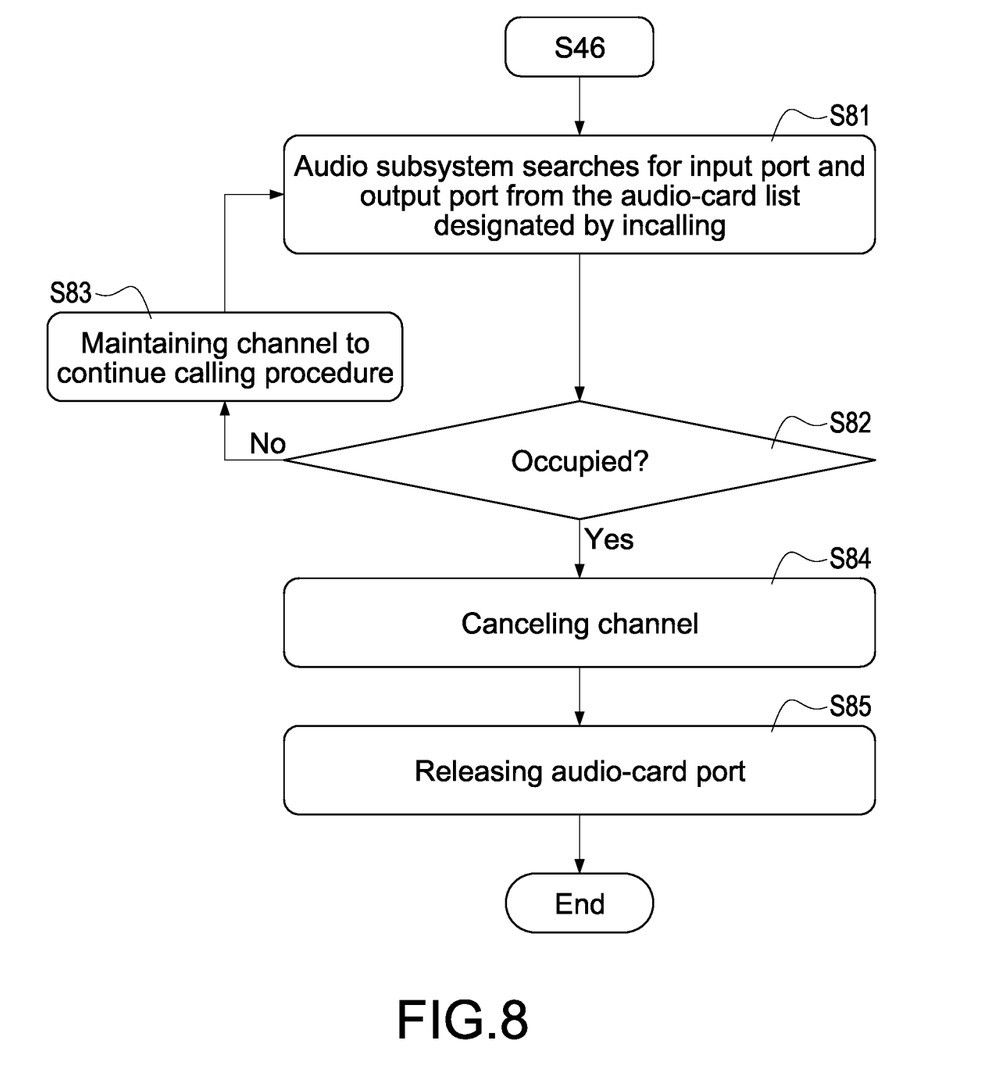
FIG. 8 is a flowchart of the release process in accordance with some embodiments of the present disclosure.

Refer to FIG. 8 is a flowchart of the release process in accordance with some embodiments of the present disclosure. As shown in FIG. 8, after the designated audio-cards/audio-card ports are concatenated by one channel or a plurality of channels and the calling procedure is implemented, the audio subsystem 43 continuously checks the status of the audio service 4111 (the step S81) through the service resource checker 431 to confirm whether the calling procedure is ended (the step S82). If the content of the audio service 4111 shows that the calling procedure is not ended (for example, the status is still the incalling), the audio subsystem 43 maintains the established channel to continue the calling procedure (the step S83) and keeps checking by the service resource checker 431.

When the service resource checker 431 detects that the status of the audio service 4111 is changed and the calling procedure is shown as ended (for example, the status is changed from incalling to no call), the audio subsystem 43 dynamically cancels the created channel (the step S84), and releases the two audio-card ports concatenated by the channel (the step S85). In one embodiment, the audio subsystem 43 closes the two designated audio-card ports through the command created by tiny ALSA to release the resources of the two audio-card ports. As a result, the other processes of the operating system 41 may use the two audio-card ports.

Through the technical solution of the present disclosure, the audio subsystem may freely switch the audio-card/audio-card port to be concatenated, and even if the electronic device is replaced with the 4G/5G network module of a different provider, the user no longer needs to adjust the content of the audio subsystem when concatenating the audio-card for 4G/5G network module. In addition, because the audio-card transmits the data to the audio subsystem itself during concatenation, the user may freely add the required plug-ins in the audio subsystem, such as the AI audio processing function, automatic calling function, audio answering function, etc. Moreover, the audio subsystem of the present disclosure continuously operates in the background of the operating system after booting, it does not require to concatenate from the upper layer to the lower layer through the audio HAL of the system framework in the operating system during calling, and thus a shorter delay time may be achieved.

While this disclosure has been described by means of specific embodiments, numerous modifications and variations may be made thereto by those skilled in the art without departing from the scope and spirit of this disclosure set forth in the claims.

What is claimed is:

1. An audio concatenation method, adopted on an electronic device having an operating system, the audio concatenation method comprising:
   a) executing an audio subsystem on the operating system;
      a1) detecting, by the audio subsystem, a plurality of audio-card drivers running on the operating system, wherein each of the audio-card drivers is corresponding to an audio-card of the electronic device;
      a2) creating an audio-card list based on a detection result in the a1), wherein the audio-card list is configured to record the audio-card drivers or the audio-cards being run on the operating system;
   b) continuously checking, by a service resource checker, of the audio subsystem, a status of an audio service in a system framework of the operating system; and
   c) upon determining that the status of the audio service is an incalling, creating by the audio subsystem, a channel to concatenate two audio-card ports designated by the incalling on the operating system to execute a calling procedure corresponding to the incalling;
      c1) searching an audio-card input port and an audio-card output port in the audio-card list designated by the incalling, and creating the channel to concatenate the audio-card input port and the audio-card output port; wherein the channel is a pulse code modulation (PCM) channel, and the audio-card input port of the operating system is configured to transmit a PCM data corresponding to the audio-card to the PCM channel, and the PCM channel is configured to transmit the PCM data to the audio-card output port; wherein the audio-card input port and the audio-card output port are related to a same audio-card, and the PCM channel comprises: a plug-in with a function of AI audio processing; and
      c2) the calling procedure further comprises: transmitting, by the audio-card input port, the PCM data to the PCM channel, executing, by the PCM channel, the AI audio processing to the PCM data and generating an AI audio response, and transmitting, by the PCM channel, the AI audio response to the audio-card output port.

2. The audio concatenation method of claim 1, wherein the c) comprises: creating, by the audio subsystem, a first PCM channel and a second PCM channel, wherein the first PCM channel is connected to the audio-card input port of a first audio-card and the audio-card output port of a second audio-card, the second PCM channel is connected to the audio-card input port of the second audio-card and the audio-card output port of the first audio-card.

3. The audio concatenation method of claim 1, wherein the electronic device at least comprises: an audio-card for a codec, an audio-card for an HDMI, and an audio-card for a 4G/5G network module, the c) comprises: creating the channel to concatenate an audio-card port of the 4G/5G network module and an audio-card port of the codec, or to concatenate an audio-card port of the 4G/5G network module and an audio-card port of the HDMI.

4. The audio concatenation method of claim 1, wherein the operating system is an AOSP or a NUTTX operating system.

5. The audio concatenation method of claim 1, wherein the audio subsystem is configured to implement the channel based on a bionic C library and implement enabling/disabling control of the two audio-card ports based on a tiny ALSA.

6. The audio concatenation method of claim 1, wherein the c) comprises: c1) determining whether the two audio-card ports designated by the incalling are occupied, when the status of the audio service is determined to be the incalling: c2) waiting while at least one of the two audio-card ports is occupied; and c3) when the two audio-card ports are unoccupied, creating the channel to concatenate the two audio-card ports to execute the calling procedure corresponding to the incalling.

7. The audio concatenation method of claim 1, further comprising: d) continuously checking, by the service resource checker, the status of the audio service to determine whether the calling procedure is ended; e) maintaining the channel until the calling procedure is ended; and f) canceling the channel and releasing the two audio-card ports, when the calling procedure is ended.

8. A non-transitory storage medium, configured to record a computer-executable program code, when the computer-executable program code is executed by an electronic device, steps in claim 1 are executed.

\* \* \* \* \*